US011895282B2

United States Patent
Watanabe (10) Patent No.: US 11,895,282 B2
(45) Date of Patent: Feb. 6, 2024

(54) IMAGE PROCESSING APPARATUS, IMAGE FORMING SYSTEM, IMAGE PROCESSING METHOD, AND NON-TRANSITORY COMPUTER-EXECUTABLE MEDIUM

(71) Applicant: Akiho Watanabe, Kanagawa (JP)

(72) Inventor: Akiho Watanabe, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/053,876

(22) Filed: Nov. 9, 2022

(65) Prior Publication Data

US 2023/0188668 A1 Jun. 15, 2023

(30) Foreign Application Priority Data

Dec. 9, 2021 (JP) ................................ 2021-199890

(51) Int. Cl.
H04N 1/60 (2006.01)

(52) U.S. Cl.
CPC ......... H04N 1/6027 (2013.01); H04N 1/6033 (2013.01)

(58) Field of Classification Search
CPC ....... H04N 1/6027; H04N 1/6033; H04N 1/60
See application file for complete search history.

(56) References Cited

U.S. PATENT DOCUMENTS

| | | | | |
|---|---|---|---|---|
| 7,230,739 B2 * | 6/2007 | Takahashi | .......... | H04N 1/00063 358/2.1 |
| 10,542,158 B1 * | 1/2020 | Terada | ................. | H04N 1/2307 |
| 11,487,488 B2 * | 11/2022 | Yabe | .................... | H04N 1/6033 |
| 2002/0054314 A1 * | 5/2002 | Takahashi | .............. | H04N 1/603 358/1.13 |
| 2011/0310446 A1 * | 12/2011 | Komatsu | ............. | H04N 1/6097 358/518 |
| 2012/0170950 A1 * | 7/2012 | Tomita | ............... | G03G 15/5058 399/39 |
| 2013/0250322 A1 * | 9/2013 | Kawabata | ............ | H04N 1/6058 358/1.9 |
| 2013/0286442 A1 | 10/2013 | Nishida | | |
| 2015/0261164 A1 * | 9/2015 | Tamura | ................ | H04N 1/6033 347/19 |
| 2017/0223224 A1 * | 8/2017 | Nagai | .................. | H04N 1/4078 |
| 2017/0227904 A1 * | 8/2017 | Matsuoka | ................ | H04N 1/54 |

(Continued)

FOREIGN PATENT DOCUMENTS

JP 2000-190572 7/2000
JP 2000190572 A * 7/2000

(Continued)

OTHER PUBLICATIONS

Extended European Search Report for 22206323.2 dated Apr. 6, 2023.

*Primary Examiner* — Ted W Barnes
(74) *Attorney, Agent, or Firm* — IPUSA, PLLC (57) ABSTRACT

An image processing apparatus includes circuitry. The circuitry receives an operation of selecting data indicating a target color in color stability control. The circuitry determines the selected data indicating the target color as correction target data indicating a target color used for the color stability control. The circuitry generates correction gamma data used for gradation correction of image data for printing according to the determined correction target data.

8 Claims, 8 Drawing Sheets

(56) References Cited

U.S. PATENT DOCUMENTS

| | | | |
|---|---|---|---|
| 2017/0272611 A1 | 9/2017 | Sagimori et al. | |
| 2018/0268269 A1* | 9/2018 | Sagimori | G06K 15/027 |
| 2019/0068796 A1* | 2/2019 | Kuroda | H04N 1/00005 |
| 2019/0387131 A1* | 12/2019 | Komatsu | H04N 1/6094 |
| 2020/0064196 A1* | 2/2020 | Inada | H04N 1/6055 |
| 2020/0162638 A1* | 5/2020 | Komatsu | H04N 1/00037 |
| 2020/0336603 A1* | 10/2020 | Kobayashi | H04N 1/6002 |
| 2021/0006664 A1* | 1/2021 | Miwa | H04N 1/4095 |
| 2021/0200493 A1* | 7/2021 | Yabe | H04N 1/00087 |
| 2021/0247714 A1* | 8/2021 | Watanabe | G03G 15/6582 |
| 2022/0114408 A1* | 4/2022 | Shindo | G06K 15/027 |

FOREIGN PATENT DOCUMENTS

| | | | | |
|---|---|---|---|---|
| JP | 3734675 B2 * | 1/2006 | | H04N 1/4078 |
| JP | 2012-165296 | 8/2012 | | |
| JP | 2013-098617 | 5/2013 | | |
| JP | 2013098617 A * | 5/2013 | | H04N 1/628 |
| JP | 2019-095711 | 6/2019 | | |
| JP | 2019095711 A * | 6/2019 | | |

\* cited by examiner

| JOB ID | JOB NAME | PRINT TIME | NUMBER OF PRINTS | REFERENCE DATA | REFERENCE SELECTION |
|---|---|---|---|---|---|
| 001 | XXXX_job.pdf | 2021/03/01 17:46:08 | 1 | gamma_C<br>gamma_M<br>gamma_Y<br>gamma_K | 0 |
| 002 | XXXX_job1.pdf | 2021/03/01 18:24:45 | 1 | gamma_C<br>gamma_M<br>gamma_Y<br>gamma_K | 0 |
| 002 | XXXX_job1.pdf | 2021/03/01 18:31:54 | 2 | gamma_C<br>gamma_M<br>gamma_Y<br>gamma_K | 0 |
| 002 | XXXX_job1.pdf | 2021/03/01 18:34:23 | 3 | gamma_C<br>gamma_M<br>gamma_Y<br>gamma_K | 1 |

FIG. 10

| Detection result | Threshold setting | Color stability control result | Manage |
|---|---|---|---|

| Print time ↓ | Job name | Number of prints | Paper name | Proof reference setting |
|---|---|---|---|---|
| 2021/03/01 18:34:23 | Test_job1.pdf | 3 | Plain Paper | ☒ |
| 2021/03/01 18:31:54 | Test_job1.pdf | 2 | Plain Paper | ☐ |
| 2021/03/01 18:24:45 | Test_job1.pdf | 1 | Plain Paper | ☐ |
| 2021/03/01 17:46:08 | XXXXX_job.pdf | 1 | Matte Paper | ☐ |
| 2021/03/01 17:46:04 | XXXX_job.pdf | 1 | Matte Paper | — |

IMAGE PROCESSING APPARATUS, IMAGE FORMING SYSTEM, IMAGE PROCESSING METHOD, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2021-199890, filed on Dec. 9, 2021, in the Japan Patent Office, the entire disclosure of which is hereby incorporated by reference herein.

BACKGROUND

Technical Field

The present disclosure relates to an image processing apparatus, an image forming system, an image processing method, and a non-transitory computer-executable medium.

Related Art

Various known image forming apparatuses correct gradation of colors used for printing. For example, known image forming apparatuses perform color stabilization processing of reading a material printed by the image forming apparatuses with a sensor and comparing the read color with a target color, to correct the gradation of image data to be printed.

For example, technology is known that measures a color of a printed material and corrects a difference between the measured color and a target color for the purpose of correcting a variation over time of the printed material.

SUMMARY

An embodiment of the present disclosure includes an image processing apparatus. The image processing apparatus includes circuitry configured to: receive an operation of selecting data indicating a target color in color stability control; determine the selected data indicating the target color as correction target data indicating a target color used for the color stability control; and generate correction gamma data used for gradation correction of image data for printing according to the determined correction target data.

An embodiment of the present disclosure includes an image forming system including an image processing apparatus and an image forming apparatus. The image processing apparatus includes circuitry configured to receive an operation of selecting data indicating a target color in color stability control, determine the selected data indicating the target color as correction target data indicating a target color used for the color stability control, generate correction gamma data used for gradation correction of image data for printing according to the determined correction target data, and correct a gradation of image data according to the correction gamma data. The image forming apparatus is configured to form an image on a conveyance medium according to the image data having the gradation corrected.

An embodiment of the present disclosure includes an image processing method performed by one or more processors. The method includes receiving an operation of selecting data indicating a target color in color stability control; determining the selected data indicating the target color as correction target data indicating a target color used for the color stability control; and generating correction gamma data used for gradation correction of image data for printing according to the determined correction target data.

An embodiment of the present disclosure includes a non-transitory computer-executable medium storing a program storing instructions which, when executed by one or more processors, causes the one or more processors to perform the above method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Embodiments of an image forming system 1 according to the present disclosure are described with reference to the drawings.

Figure 1:
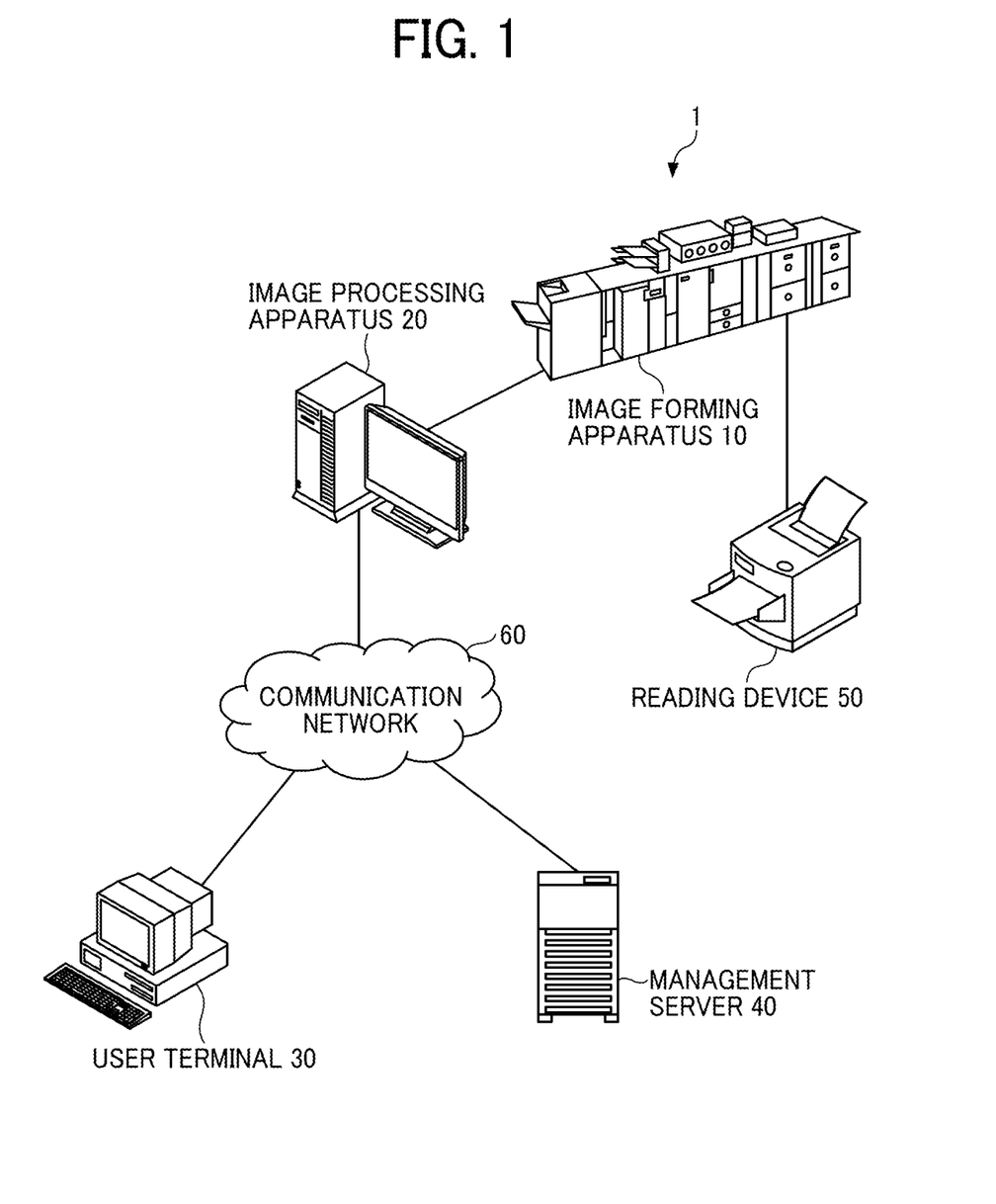
FIG. 1 is a schematic diagram illustrating an example of an overall configuration of an image forming system, according to an embodiment of the present disclosure.

FIG. 1 is a schematic diagram illustrating an example of an overall configuration of the image forming system 1 according to the embodiment.

The image forming system 1 includes an image forming apparatus 10, an image processing apparatus 20, a user terminal 30, a management server 40, and a reading device 50. The image processing apparatus 20, the user terminal 30, and the management server 40 are communicably connected with each other through a communication network 60.

The image forming apparatus 10 is an apparatus that forms an image. Examples of the image forming apparatus 10 include, but are not limited to, a color production printer, a laser printer, and an inkjet printer. The image forming apparatus 10 receives image data from the image processing apparatus 20 and prints an image on a sheet according to the received image data. The sheet is an example of a conveyance medium on which an image is to be formed.

The image processing apparatus 20 is an apparatus that processes image data according to which the image forming apparatus 10 forms an image. Examples of the image processing apparatus 20 include, but are not limited to, a digital front end (DFE). The image processing apparatus 20 is communicably connected to the image forming apparatus 10.

In response to receiving printing job data with a signal that instructs to print an image from the user terminal 30 or the management server 40, the image processing apparatus 20 converts the printing job data into image data in a format that can be by the image forming apparatus 10 by a built-in raster image processor (RIP) engine. The image processing apparatus 20 transmits the converted image data to the image forming apparatus 10.

The user terminal 30 is a terminal operated by a user and instructs printing of an image. Specifically, the user terminal 30 transmits job data including image data to the image processing apparatus 20 or the management server 40. Further, the user terminal 30 transmits, to the image processing apparatus 20, data indicating a threshold value in color stabilization processing according to an operation by the user. Furthermore, the user terminal 30 displays a screen indicating an execution status of the color stabilization processing in response to display control by the image processing apparatus 20.

In response to receiving the job data from the user terminal 30, the management server 40 adds the received job data as a queue to a memory that stores job data waiting to be printed. Further, the management server 40 extracts certain job data from the queue in the order in which multiple pieces of job data are added to the queue or according to a priority that is appropriately set. The management server 40 transmits the extracted job data to the image processing apparatus 20.

The reading device 50 is a device that reads an image that is formed on a sheet by the image forming apparatus 10. The reading device 50 is communicably connected to the image forming apparatus 10. The reading device 50 transmits read image data representing the read image to the image processing apparatus 20 via the image forming apparatus 10. In one example, the reading device 50 reads an image by a spectral sensor. In another example, the reading device 50 is any suitable other device such as a red, green, and blue (RGB) scanner, provided that it is capable of converting an original image into digital image data. In still another example, the reading device 50 is built in the image forming apparatus 10, such as an inline sensor.

The communication network 60 is, for example, a local area network (LAN) or the Internet. The communication network 60 is a network that implements data communication.

Figure 2:
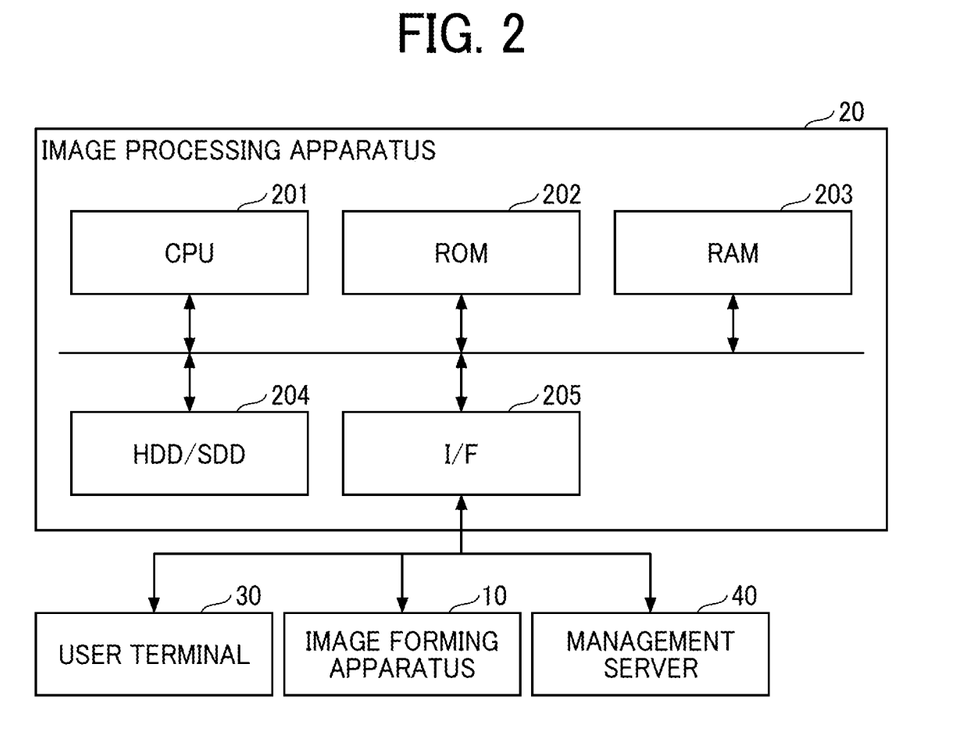
FIG. 2 is a block diagram illustrating an example of a hardware configuration of an image processing apparatus, according to an embodiment of the present disclosure.

FIG. 2 is a block diagram illustrating an example of a hardware configuration of the image processing apparatus 20.

The image processing apparatus 20 is implemented by a computer. The image processing apparatus 20 includes a central processing unit (CPU) 201, a read only memory (ROM) 202, a random access memory (RAM) 203, a hard disk drive (HDD)/solid state drive (SSD) 204, and an interface (I/F) 205, which are connected to each other via a bus.

The CPU 201 loads programs stored in the ROM 202 or the HDD/SSD 204 onto the RAM 203. The CPU 201 executes various processing described below according to the programs loaded onto the RAM 203.

The ROM 202 is a nonvolatile auxiliary storage device. The ROM 202 stores programs such as a basic input/output system (BIOS) that define programed basic operations of the image processing apparatus 20.

The RAM 203 is a volatile main storage device. The RAM 203 is used as a work area for the CPU 201.

The HDD/SSD 204 is a nonvolatile auxiliary storage device having a large capacity. The HDD/SSD 204 stores, for example, the received image data, programs for executing various processing described below, and settings information.

The I/F 205 includes, for example, a LAN card. The I/F 205 is a relay device that allows the image processing apparatus 20 to communicate with the image forming apparatus 10, the user terminal 30, or the management server 40.

Figure 3:
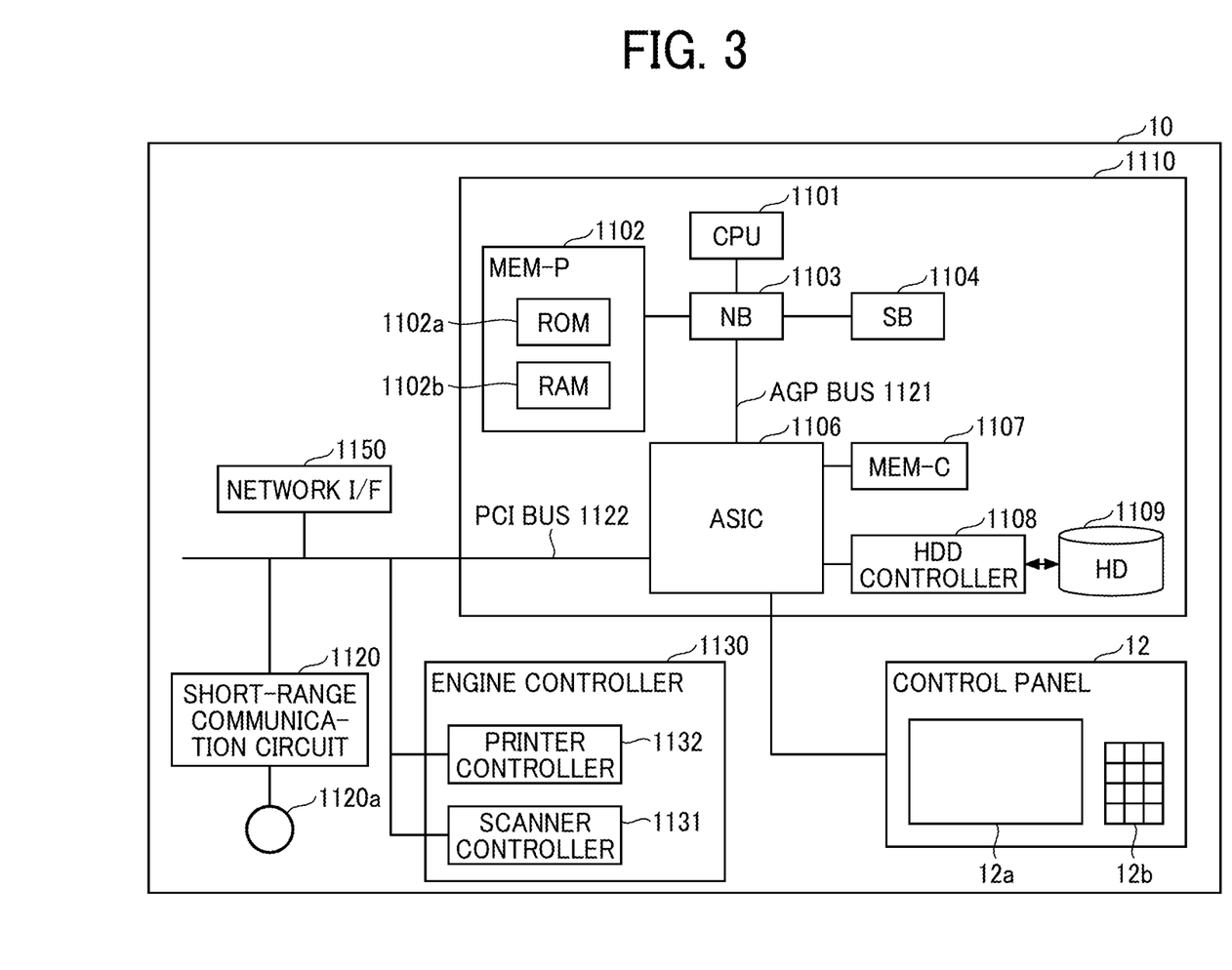
FIG. 3 is a block diagram illustrating an example of a hardware configuration of an image forming apparatus, according to an embodiment of the present disclosure.

FIG. 3 is a diagram illustrating an example of a hardware configuration of the image forming apparatus 10.

The image forming apparatus 10 includes a controller 1110, a short-range communication circuit 1120, an engine controller 1130, a control panel 12, and a network I/F 1150.

The controller 1110 includes a CPU 1101 as a main component of a computer, a system memory (MEM-P) 1102, a north bridge (NB) 1103, a south bridge (SB) 1104, an application specific integrated circuit (ASIC) 1106, a local memory (MEM-C) 1107 as a storage device, an HDD controller 1108, and a hard disk (HD) 1109 as a storage device.

The NB 1103 and the ASIC 1106 are connected through an accelerated graphics port (AGP) bus 1121.

The CPU 1101 is a processor that controls overall operation of the image forming apparatus 10.

The NB 1103 is a bridge to connect the CPU 1101 to the MEM-P 1102, the SB 1104, and the AGP bus 1121. The NB 1103 includes a memory controller that controls reading and writing data from and to the MEM-P 1102, a peripheral component interconnect (PCI) master, and an AGP target.

The MEM-P 1102 includes a ROM 1102a and a RAM 1102b. The ROM 1102a is a memory that stores programs and data for implementing various functions of the controller 1110. The RAM 1102b is used as a memory that deploys programs or data, or as a drawing memory that stores drawing data for printing. In one example, the programs stored in the RAM 1102b are stored in any computer-readable storage (recording) medium, such as a compact disc-read only memory (CD-ROM), compact disc-recordable (CD-R), or DVD, in a file format installable or executable by the computer, for distribution.

The SB 1104 is a bridge that connects the NB 1103 to a PCI device or a peripheral device. The ASIC 1106 is an integrated circuit (IC) for use in image processing having hardware elements for image processing. The ASIC 1106 serves as a bridge connecting the AGP bus 1121, a PCI bus 1122, the HDD controller 1108, and the MEM-C 1107 to each other.

The ASIC 1106 includes a PCI target, an AGP master, an arbiter (ARB) as a central processor of the ASIC 1106, a memory controller to control the MEM-C 1107, a plurality of direct memory access controllers (DMACs), and a PCI unit. The DMACs rotates image data with a hardware logic, for example. The PCI unit transfers data between a scanner controller 1131 and a printer controller 1132 through the PCI bus 1122. In one example, a universal serial bus (USB) interface or an Institute of Electrical and Electronics Engineers 1394 (IEEE 1394) interface is connected to the ASIC 1106.

The MEM-C 1107 is a local memory used as a copy image buffer and a code buffer. The HD 1109 is a storage device that stores, for example, image data, font data used in printing, and forms. The HD 1109 controls reading or writing of data from or to the HD 1109 under control of the CPU 1101.

The AGP bus 1121 is a bus interface for a graphics accelerator card that is devised for accelerating graphic processing. The AGP bus 1121 directly accesses the MEM-P 1102 with high throughput to accelerate the graphics accelerator card.

The short-range communication circuit 1120 includes a short-range communication antenna 1120a. The short-range communication circuit 1120 is a communication circuit that communicates in compliance with the near field radio communication (NFC) or the Bluetooth®, for example.

The engine controller 1130 includes the scanner controller 1131 and the printer controller 1132. The control panel 12 includes a panel display 12a and hardware keys 12b. The panel display 12a is, e.g., a touch panel that displays current settings or a selection screen and that receives inputs from an operator. The hardware keys 12b include, e.g., a numeric keypad and a start key. The numeric keypad receives assigned values of image forming parameters such as an image density parameter. The start key receives an instruction to start copying.

The controller 1110 controls overall operation of the image forming apparatus 10 and controls, for example, drawing, communication, and input from the control panel 12. The scanner controller 1131 reads the image formed on the conveyance medium such as a sheet, to generate image data. The printer controller 1132 includes, for example, a transfer device to transfer the image using a color material such as a toner image onto the conveyance medium such as the sheet, a fixing device to fix the image, a heating device, and a drying device, and performs image formation on the sheet. Further, the scanner controller 1131 or the printer controller 1132 performs image processing such as error diffusion and gamma conversion.

The network I/F 1150 is an interface for performing data communication using a communication network. The short-range communication circuit 1120 and the network I/F 1150 are electrically connected to the ASIC 1106 via the PCI bus 1122.

Figure 4:
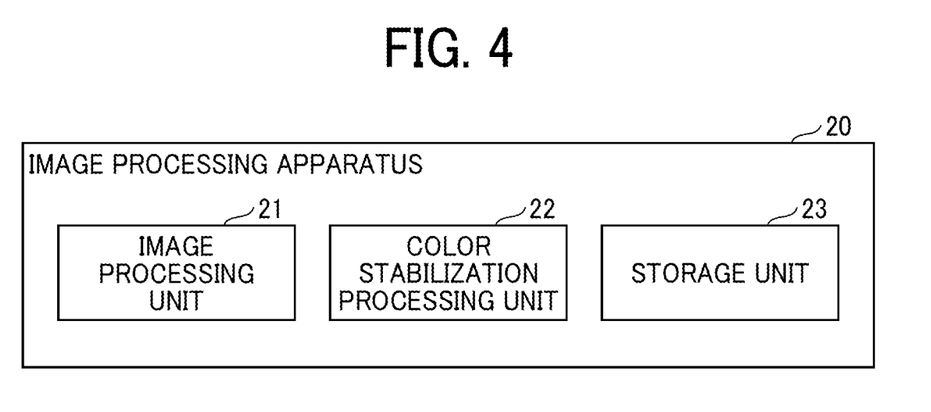
FIG. 4 is a first block diagram illustrating an example of a functional configuration of the image processing apparatus, according to an embodiment of the present disclosure.

FIG. 4 is a first block diagram illustrating an example of a functional configuration of the image processing apparatus 20.

The image processing apparatus 20 includes an image processing unit 21, a color stabilization processing unit 22, and a storage unit 23.

The image processing unit 21 performs RIP processing of converting an original image into image data that can be output by the image forming apparatus 10.

The color stabilization processing unit 22 performs processing of stabilizing color conversion in image processing performed by the image processing unit 21. Specifically, the color stabilization processing unit 22 updates correction gamma data used for color conversion by the image processing unit 21 on the basis of a difference between a target color and a color read from the read image data.

The storage unit 23 stores correction gamma data used for color conversion by the image processing unit 21.

Figure 5:
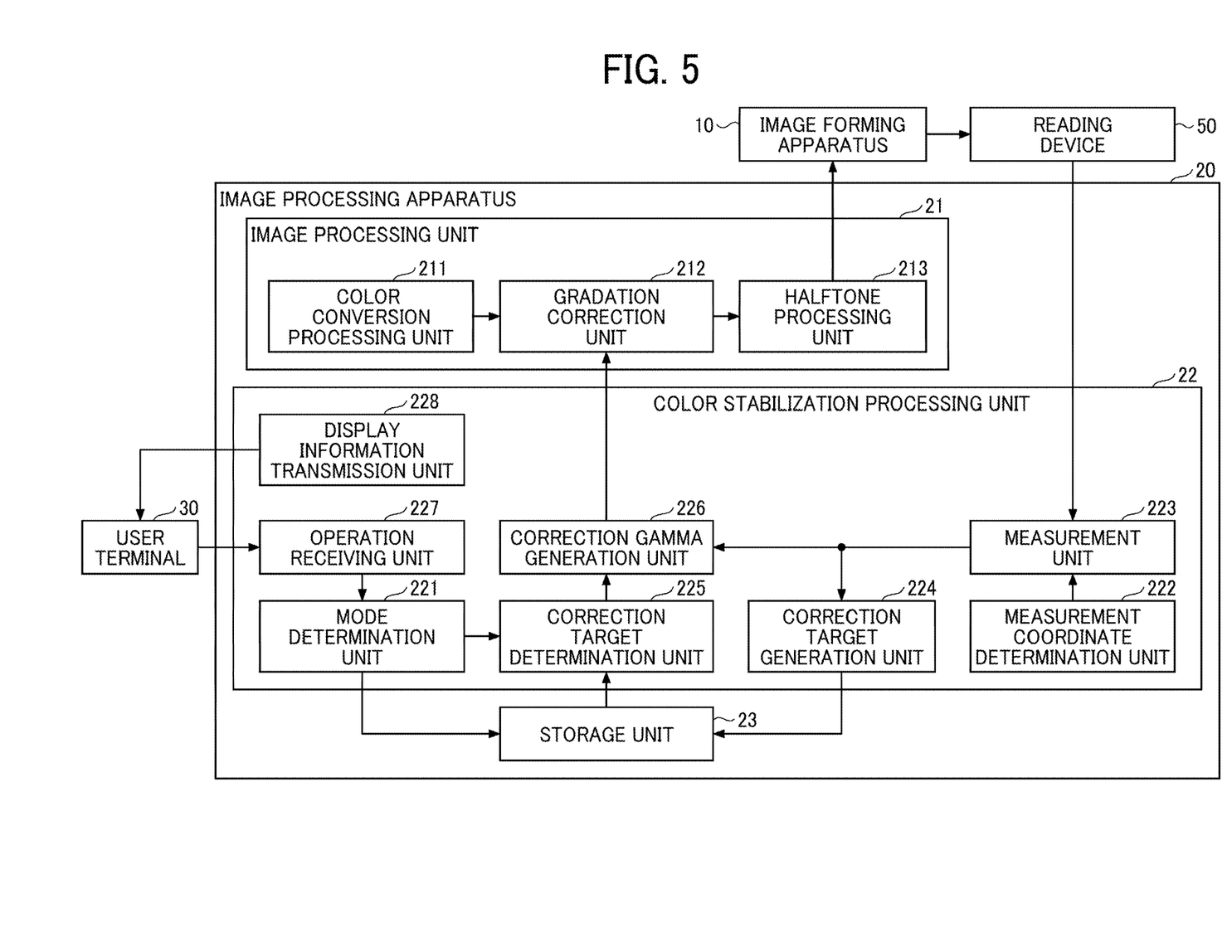
FIG. 5 is a second block diagram illustrating an example of a functional configuration of the image processing apparatus, according to an embodiment of the present disclosure.

FIG. 5 is a second diagram illustrating an example of a functional configuration of the image processing apparatus 20.

The image processing unit 21 includes a color conversion processing unit 211, a gradation correction unit 212, and a halftone processing unit 213. The color conversion processing unit 211 performs profile conversion on a color space of image data of an original included in the received job data according to designation by a user. For example, the color conversion processing unit 211 converts the image data of the original into image data in cyan, magenta, yellow, and black (CMYK) color space according to the characteristics of the engine or converts the image data of the original into a grayscale image using brightness information.

The gradation correction unit 212 corrects a gradation value of the image data of the original converted by the color conversion processing unit 211 to a given gradation value that is set. Since a linear gamma is set as a default setting value, the gradation of the image data does not change. When the correction gamma data is updated in response to the correction result by the color stabilization processing unit 22, the color conversion processing unit 211 corrects the gradation value of the image data on the basis of the updated correction gamma data.

The halftone processing unit 213 performs gradation conversion processing on the 8-bit image data of the original to generate binary image data that can be output by the engine.

The image processing unit 21 transmits the processed image data to the image forming apparatus 10. The image forming apparatus 10 forms an image on a sheet based on the received image data.

The color stabilization processing unit 22 includes a mode determination unit 221, a measurement coordinate determination unit 222, a measurement unit 223, a correction target generation unit 224, a correction target determination unit 225, a correction gamma generation unit 226, an operation receiving unit 227, and a display information transmission unit 228.

The mode determination unit 221 determines a color reference mode selected according to a user's operation and notifies the correction target determination unit 225 of the color reference mode that is selected. The color reference mode is an operating mode indicating how to determine a target color as a reference for correcting a color. For example, the color reference mode is selected according to an operation by a user from among "proof reference," "fixed reference," and "initial reference."

The "proof reference" is an operating mode in which a color based on test printing (proof printing) is used as a reference. The "fixed reference" is an operating mode in which a color that is determined in advance is used as a reference. The "Initial reference" is an operating mode in which a color of initial printing (e.g., the first page) in the same printing job data is used as a reference.

The measurement coordinate determination unit 222 determines an image position (measurement coordinate) of an area suitable for measurement on the basis of the image data of the original and characteristic information of a sheet. In one example, the measurement coordinate determination unit 222 determine multiple measurement coordinates. In this case, the measurement coordinate determination unit 222 generates list data that associate the multiple determined measurement coordinate positions with job information and page information.

The measurement unit 223 receives the read image data from the reading device 50 and measures a color of the read image data on the basis of the measurement coordinate determined by the measurement coordinate determination unit 222. The measurement unit 223 inputs, to the correction target generation unit 224, color information indicating the measured color in order to generate correction target data. In a case of the color reference mode in which the correction target is not generated, the measurement unit 223 inputs the color information to the correction gamma generation unit 226.

The correction target generation unit 224 generates correction target data on the basis of color information such as a red, green, and blue (RGB) value and a Lab value. The correction target generation unit 224 stores the generated correction target data in the storage unit 23 with information indicating a job identifier (ID), a print time, the number of times of printing, for example.

The correction target determination unit 225 acquires information indicating the color reference mode selected according to an operation by a user from the mode determination unit 221, and determines correction target data indicating a target color used for the color stability control on the basis of the job information.

The correction gamma generation unit 226 detects a difference between the determined correction target data and color information such as an RGB value and a Lab value of a page to be processed, and generates correction gamma data for correcting the image data of the original. The correction gamma generation unit 226 sets the generated correction gamma data in the gradation correction unit 212. The correction gamma data that is set is used for printing the next page to be processed.

The operation receiving unit 227 receives a user's operation of selecting a desired color reference mode via the user terminal 30. Further, when the color reference mode is the "proof reference," the operation receiving unit 227 receives a user's operation of setting a proof reference. The proof reference is the correction target data used as a reference.

The display information transmission unit 228 transmits display information for displaying a control result such as a job name, a print time, the number of times of printing to the user terminal 30 when printing is completed. The user terminal 30 performs display according to the received display information. The functional units of the image processing apparatus 20 are implemented by or are caused to function by operation of any of the components illustrated in FIG. 2 according to instructions of the CPU 201 according to the programs loaded from the ROM 202 or the HDD/SSD 204 onto the RAM 203, for example.

A description is now given of an operation performed by the image processing apparatus 20, according to an embodiment.

In response to an instruction to perform printing with a color stabilization function set to ON, job information, information on a sheet used for printing, and image data of an original are input to the color stabilization processing unit 22. Then, the color stabilization processing unit 22 performs color stabilization processing.

Figure 6:
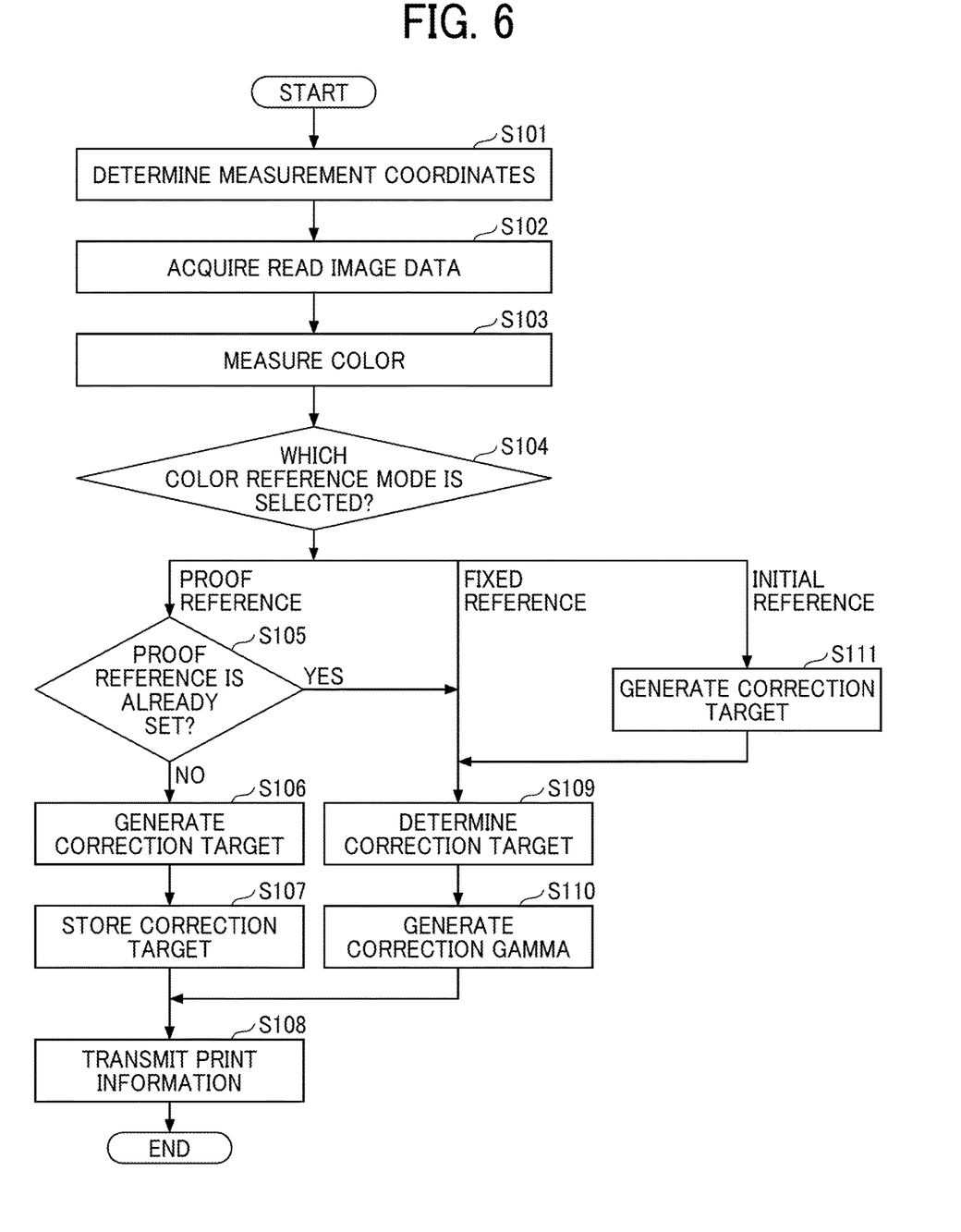
FIG. 6 is a flowchart of an example of color stabilization processing, according to an embodiment of the present disclosure.

FIG. 6 is a flowchart of an example of the color stabilization processing.

The measurement coordinate determination unit 222 determines measurement coordinates (step S101). Specifically, it is desirable that a position to be measured is a position where a change in gradation is gradual and that the position can be measured evenly from a printing surface. In view of this, for example, the measurement coordinate determination unit 222 extracts pixel values each having a size that can be measured colorimetrically from the image data and calculates flatness. The measurement coordinate determination unit 222 may calculate the flatness using, for example, a low pass filter or Fourier transform. For example, a position at which a gap between the maximum pixel value and the minimum pixel value is small in the colorimetrically measurable size is determined as a colorimetric position with superior flatness. In another example, the measurement coordinate determination unit 222 determines the measurement position using a method such as clustering so that the measurement position is not biased.

Next, the measurement unit 223 acquires the read image data from the reading device 50 (step S102) and measures a color at the measurement coordinates of the read image (step S103).

Next, the mode determination unit 221 determines a color reference mode selected according to a user's operation and notifies the correction target determination unit 225 of the selected color reference mode (step S104). When the mode determination unit 221 determines that the color reference mode is the "proof reference" (step S104: proof reference), the correction target generation unit 224 determines whether the proof reference is already set (step S105).

On the basis of the determination result indicating that the proof reference is not already set (step S105: No), the correction target generation unit 224 generates a correction target (step S106) and causes the storage unit 23 to store the generated correction target data (step S107). Specifically, the correction target generation unit 224 decomposes the Lab value or the RGB value into CMYK, to generate correction target data represented by a gamma value. For example, the correction target generation unit 224 performs color separation from the lab value into CMYK by using a lookup table.

Then, the display information transmission unit 228 transmits print information to the user terminal 30 (step S108).

When, in step S104, the mode determination unit 221 determines that the color reference mode is the "fixed reference" (step S104: fixed reference), the correction target determination unit 225 determines correction target data (step S109). Similarly, when, in step S105, the correction target generation unit 224 determines that the proof reference is already set (step S105: Yes), the operation proceeds to a process of step S109.

Then, the correction gamma generation unit 226 generates correction gamma data (step S110). Then, the display information transmission unit 228 transmits print information to the user terminal 30 (step S108).

When, in step S104, the mode determination unit 221 determines that the color reference mode is the "initial reference" (step S104: initial reference), the correction target generation unit 224 generates correction target data (step S111). Then, the correction target determination unit 225 determines correction target data (step S109).

A description is now given of a flow of printing when the color reference mode is the "proof reference," according to an embodiment.

Figure 7:
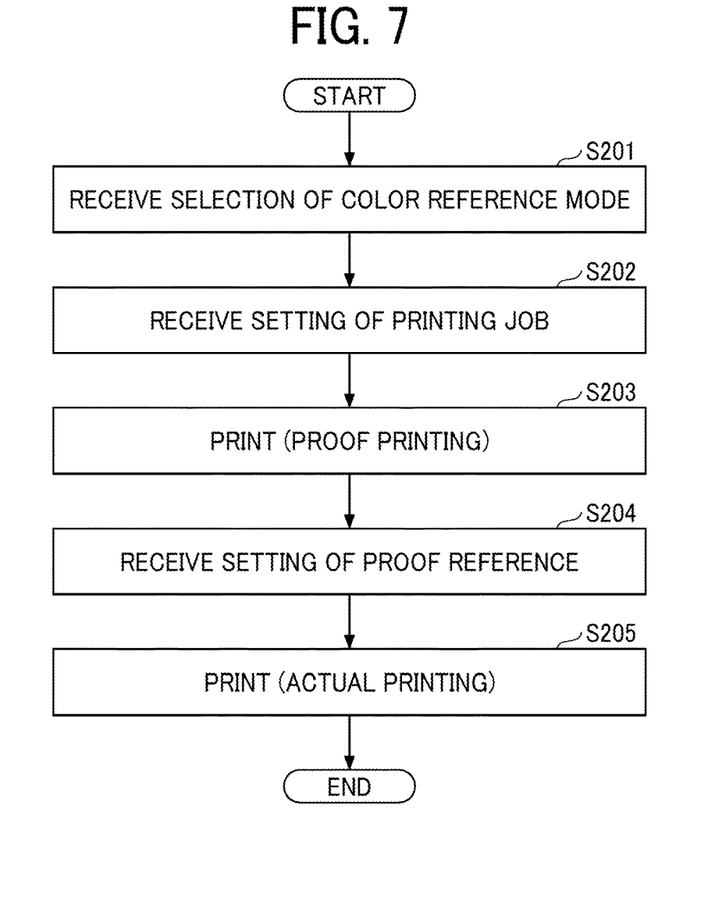
FIG. 7 is a flowchart for describing a flow of proof printing, according to an embodiment of the present disclosure.

FIG. 7 is a flowchart for describing a flow of proof printing.

The operation receiving unit 227 receives a user's operation of selecting a desired color reference mode via the user terminal 30 (step S201). In the example of FIG. 7, the operation receiving unit 227 receives an operation of selecting the "proof reference".

Next, the operation receiving unit 227 receives settings of a printing job via the user terminal 30 (step S202). Example of the settings of the printing job include, but are not limited to, a sheet setting and a color profile setting. At this time, a job ID, which is an identification number identifying each printing job data is assigned.

Then, the image forming apparatus 10 prints an image on a sheet (step S203). This printing functions as proof printing (test printing). The user checks whether a printed matter is obtained as the user expects. For example, the user checks a setting of imposition, or a print position.

With regard to the color, when the user has received designation of a color by way of a color patch or a color proof document from, for example, a customer or when the user has a bad impression that the color dulls, for example, gamma adjustment is performed to adjust the color. In one example, trial-and-error adjustment is repeated for fine adjustment on the basis of the current engine state.

In one example, in step S203, the image forming apparatus 10 performs printing using a proof-printing function. In another example, the image forming apparatus 10 performs printing using a normal printing function. The proof printing function is a function of always printing only one copy regardless of the number of copies designated on a printing job setting screen. The normal printing function is a function in which a user designates a desired number of copies and printing is performed according to the designated number of copies. When the normal printing function is used, for example, a user designates the number of copies to one on the printing job setting screen.

The image processing apparatus 20 performs the color stabilization processing described above with reference to FIG. 6 after the printing by the image forming apparatus 10 in step S203. In this case, since the color reference mode is set to "proof reference" in step S104, the image processing apparatus 20 performs the process of step S105. Since the proof reference is not set in the process of step S105, the operation proceeds to step S106, and the correction target generation unit 224 generates the correction target data.

The image forming apparatus 10 may repeatedly perform the process of step S203 until the user determines that the color is a desired color. Then, the operation receiving unit 227 of the image processing apparatus 20 receives settings of a proof reference on a proof reference settings screen on which print information is displayed (step S204). A specific example of the proof reference settings screen is described below.

Then, the image forming apparatus 10 prints an image on a sheet (step S205). The printing functions as actual printing. The image processing apparatus 20 further performs the color stabilization processing described above with reference to FIG. 6 after the printing by the image forming apparatus 10 in step S205. In this case, since the color reference mode is set to "proof reference" in step S104, the image processing apparatus 20 performs the process of step S105. Since the proof reference is set in the process of step S105, the operation proceeds to step S109, and the correction target determination unit 225 determines the correction target data.

A described is now given of screens displayed on the user terminal 30 and relevant information, according to an embodiment.

Figure 8:
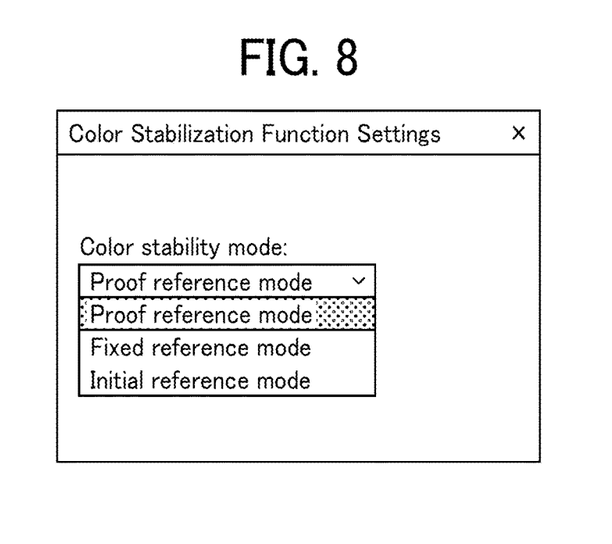
FIG. 8 is an illustration of an example of a color reference mode selection screen, according to an embodiment of the present disclosure.

FIG. 8 is an illustration of an example of a color reference mode selection screen. The color reference mode selection screen receives selection of any one from "proof reference," "fixed reference," and "initial reference" as a color reference mode.

As a use case for each mode, for example, when a user wants to reproduce the same color for multiple printing jobs, the user may select the "fixed reference." When the user wants to reproduce the same color in one job, the user may select "initial reference." When the user wants to reproduce the color of the finished proof print, the user may select "proof reference."

The user selects an optimum mode according to a use case. The above-described three modes are merely examples of the color reference mode. In another example, any other suitable options are provided. For example, a color reference mode that allows a user to directly generate and set gamma data of optimum color characteristics may be provided. In another example, switching between the color reference modes is set for each job.

Figure 9:
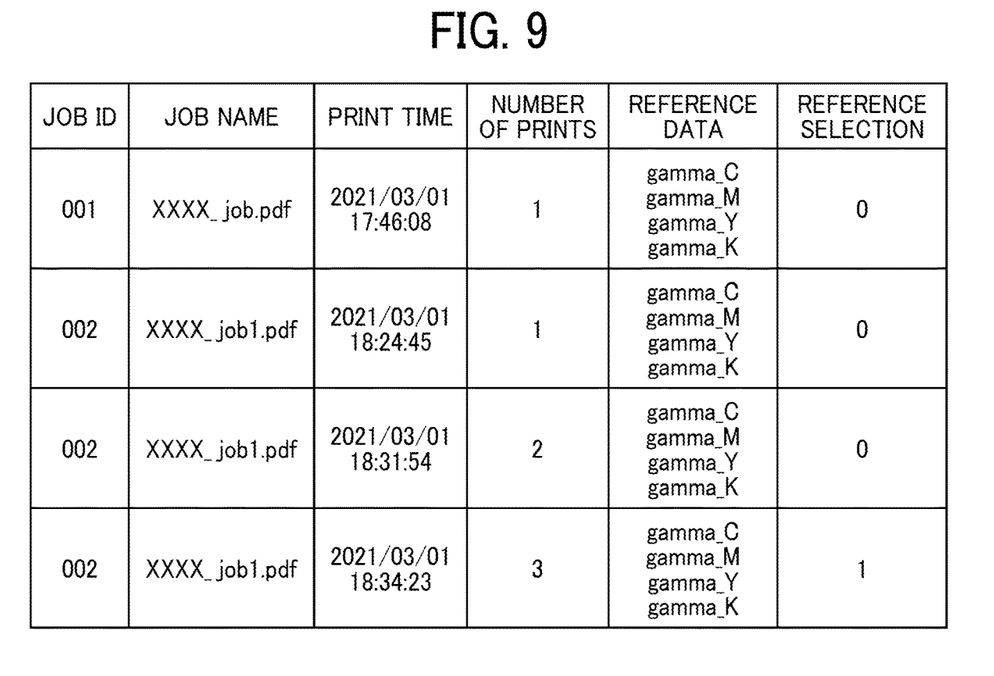
FIG. 9 is a table illustrating an example of print information, according to an embodiment of the present disclosure.

FIG. 9 is a table illustrating an example of the print information.

The print information stored in the storage unit 23 includes, for example, items "job ID," "job name," "print time," "number of prints," "reference data," and "reference selection."

A value of the item "job ID" is an identifier for identifying corresponding printing job data. A value of the item "job name" is a name of corresponding printing job data in the storage unit 23.

A value of the item "print time" is the time when corresponding printing job data is actually printed. A value of the item "number of prints" is the number of times corresponding printing job data is printed.

A value of the item "reference data" is correction target data used for gradation correction of corresponding printing job data. A value of the item "reference selection" is a flag value indicating whether corresponding printing job data is set as a proof reference according to a user's operation. For example, "1" is a value indicating that the printing job data is set as a proof reference.

In step S109 of the color stabilization processing described with reference to FIG. 6, the correction target determination unit 225 determines the correction target data indicated by the item "reference data" in the entry in which the value of the item "reference selection" is "1" as correction target data.

Figure 10:
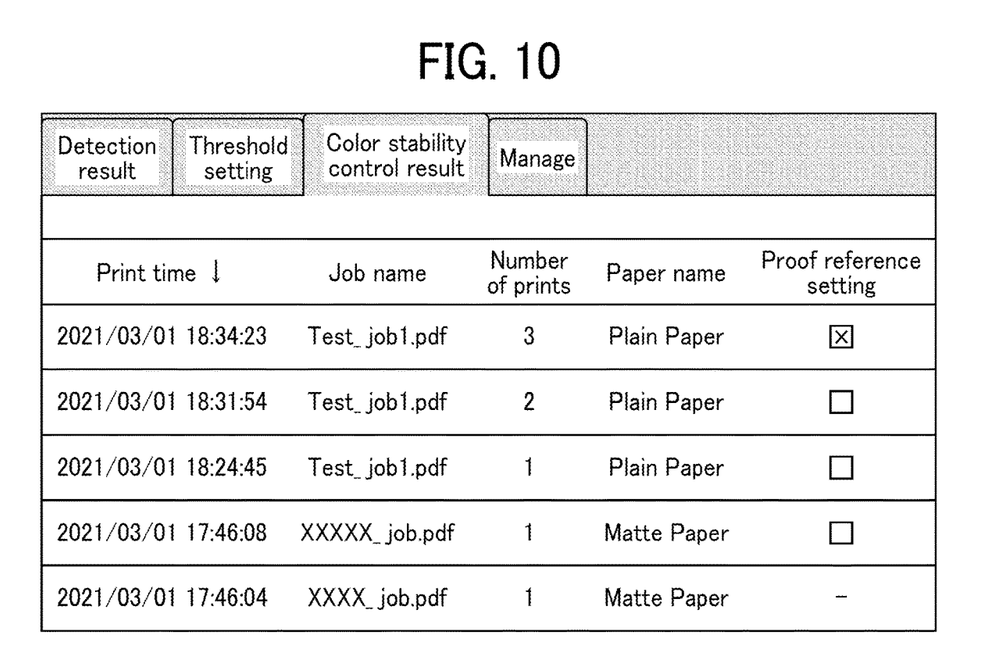
FIG. 10 is an illustration of an example of a proof reference settings screen, according to an embodiment of the present disclosure.

FIG. 10 is an illustration of an example of the proof reference settings screen. In response to receiving print information from the image processing apparatus 20 in step S108 of the color stabilization processing described above with reference to FIG. 6, the user terminal 30 displays the proof reference settings screen including the received print information. The user views the print information displayed on the proof reference settings screen and select desired printing job data to be set as a proof reference. In one example, in view of a case that the same printing job data is printed multiple times, the proof reference settings screen has a configuration that print job data to be used as a proof reference can be selected for each number of prints. This makes it possible to select which number of prints is suitable as a proof reference.

Each time printing of the same job is performed, the number of prints is incremented. In one example, the number of prints is included in the job name. In other words, for the same printing job data, different job names are assigned respective times printing is performed.

According to the image forming system 1 of the present embodiment, gradation correction processing is performed using correction target data based on a color set as the proof reference by a user. With this configuration, a correction target for performing a color stability control is switched according to a use case of a user. Thus, color stability that matches a use case is implemented.

Second Embodiment

A description is now given of a second embodiment. In the second embodiment, a case that the "fixed reference" is selected as the color reference mode is described. In the following description of the second embodiment, differences from the first embodiment are focused. In the following description, the same reference numerals are given to the same or corresponding functions or configurations as those of the first embodiment, and the redundant descriptions are omitted or simplified appropriately.

In the present embodiment, a description is given of a flow of printing when the color reference mode is the "fixed reference."

Referring again to FIG. 7, the operation receiving unit 227 receives a user's operation of selecting a desired color reference mode via the user terminal 30 (step S201). In the embodiment, a user selects the "fixed reference."

In this case, the process of step S203 and step S204 of FIG. 7 are skipped. Then, the image forming apparatus 10 prints an image on a sheet (step S205). The image processing apparatus 20 performs the color stabilization processing described above with reference to FIG. 6 after the printing by the image forming apparatus 10.

In this case, since the color reference mode is set to the "fixed reference" in step S104, the operation proceeds to the process of step S109, and the correction target determination unit 225 of the image processing apparatus 20 determines correction target data stored in advance in the storage unit 23.

According to the image forming system 1 of the present embodiment, gradation correction processing is performed using correction target data based on a color set as the fixed reference by a user. With this configuration, the same color is reproduced for multiple printing jobs.

Third Embodiment

A description is now given of a third embodiment. In the third embodiment, a case that the "initial reference" is selected as the color reference mode is described. In the following description of the third embodiment, differences from the first embodiment are focused. In the following description, the same reference numerals are given to the same or corresponding functions or configurations as those of the first embodiment, and the redundant descriptions are omitted or simplified appropriately.

In the present embodiment, a description is given of a flow of printing when the color reference mode is the "initial reference."

Referring again to FIG. 7, the operation receiving unit 227 receives a user's operation of selecting a desired color reference mode via the user terminal 30 (step S201). In the embodiment, a user selects the "initial reference."

In this case, the process of step S203 and step S204 of FIG. 7 are skipped. Then, the image forming apparatus 10 prints an image on a sheet (step S205). The image processing apparatus 20 performs the color stabilization processing described above with reference to FIG. 6 after the printing by the image forming apparatus 10.

In this case, since the color reference mode is set to the "initial reference" in step S104, the operation proceeds to the process of step S111, and the correction target generation unit 224 of the image processing apparatus 20 generates correction target data on the basis of information of the first page of a printing job, for example.

In another example, the correction target generation unit 224 generates correction target data on the basis of information obtained by averaging multiple pages at the beginning of a printing job for reducing unevenness, for example. The correction target generation unit 224 stores the generated correction target data in the storage unit 23.

In printing of the subsequent pages, the correction target determination unit 225 determines the correction target data stored in the storage unit 23 as correction target data to be used.

According to the image forming system 1 of the present embodiment, gradation correction processing is performed using correction target data based on a color set as the initial reference by a user. With this configuration, the same color is reproduced in one printing job.

In one example, in each of the embodiments described above, the image forming apparatus 10 and the image processing apparatus 20 are configured to share the disclosed processing steps in various combinations. In one example, each element of the image forming apparatus 10 and the image processing apparatus 20 is integrated into one apparatus or is divided into multiple apparatuses.

In an embodiment, some of the functions of the image processing apparatus 20 are implemented by, for example, an information processing apparatus. In one example, the information processing apparatus is configured as an information processing system including a plurality of computing devices such as a server cluster. In one example, the plurality of computing devices is configured to communicate with one another through any type of communication link including a network and a shared memory and performs the processes disclosed herein.

According to the related art, a target color in color stabilization control is defined as a "pre-stored output color." In other words, a desired target color cannot be selected in accordance with a use case. This provides a drawback that color correction is performed aiming at a color different from an output color that a user wants to obtain.

According to one or more embodiments of the present disclosure, color stability control suitable for a use case is implemented.

The functionality of the elements of the embodiments described above may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image processing apparatus, comprising circuitry configured to:
   receive an operation of selecting data indicating a target color in color stability control,
   determine the selected data indicating the target color as correction target data indicating a target color used for the color stability control; and
   generate correction gamma data used for gradation correction of image data for printing according to the determined correction target data, wherein
   in a case that an operating mode using a color based on proof printing as a reference is set as an operating mode indicating a color reference, the circuitry receives selection of the data indicating the target color in the color stability control from printing job data on which the proof printing is performed.

2. The image processing apparatus of claim 1, wherein the circuitry receives the selection of the data indicating the target color in the color stability control for each of numbers of times of printing from the printing job data on which the proof printing is performed.

3. The image processing apparatus of claim 1, wherein the circuitry receives an operation of selecting the operating mode indicating the color reference from the operating mode using the color based on the proof printing as the reference, an operating mode using a color determined in advance as a reference, and an operating mode using a color of an initial printing in a same printing job data as a reference.

4. The image processing apparatus of claim 1, wherein in a case that:
   the operating mode using the color based on the proof printing as the reference is set as the operating mode indicating the color reference; and
   no selection of the data indicating the target color is received,
   the circuitry is further configured to generate the correction target data according to color information measured from read image data and store the generated correction target data and print information in a memory.

5. The image processing apparatus of claim 4, wherein in the case that:
   the operating mode using the color based on the proof printing as the reference is set as the operating mode indicating the color reference; and
   no selection of the data indicating the target color is received,
   the circuitry is further configured to transmit display information including the correction target data generated according to the color information measured from the read image data and the print information to a user terminal.

6. An image forming system, comprising:
   an image processing apparatus; and
   an image forming apparatus,
   the image processing apparatus including circuitry configured to
      receive an operation of selecting data indicating a target color in color stability control,
      determine the selected data indicating the target color as correction target data indicating a target color used for the color stability control,
      generate correction gamma data used for gradation correction of image data for printing according to the determined correction target data, and
      correct a gradation of image data according to the correction gamma data,
   the image forming apparatus being configured to form an image on a conveyance medium according to the image data having the gradation corrected, and
   the circuitry of the image processing apparatus being further configured to, in a case that an operating mode using a color based on proof printing as a reference is set as an operating mode indicating a color reference, receive selection of the data indicating the target color in the color stability control from printing job data on which the proof printing is performed.

7. An image processing method performed by one or more processors and an image processing apparatus, the method comprising:
   receiving an operation of selecting data indicating a target color in color stability control;
   determining the selected data indicating the target color as correction target data indicating a target color used for the color stability control; and
   generating correction gamma data used for gradation correction of image data for printing according to the determined correction target data, wherein
   in a case that an operating mode of the image processing apparatus using a color based on proof printing as a reference is set as an operating mode indicating a color reference, the receiving includes receiving selection of the data indicating the target color in the color stability control from printing job data on which the proof printing is performed.

8. A non-transitory computer-executable medium storing a program storing instructions which, when executed by one or more processors, causes the one or more processors to perform the method of claim 7.

* * * * *